United States Patent [19]

Siedenstrang et al.

[11] 4,456,706

[45] * Jun. 26, 1984

[54] MOLDING COMPOUNDS, SPONGE ARTICLES PRODUCED THEREFROM AND PROCESS OF PRODUCTION

[75] Inventors: Roy W. Siedenstrang; Agmund K. Thorsrud, both of Stow, Ohio

[73] Assignee: Phillips Petroleum Company, Bartlesville, Okla.

[*] Notice: The portion of the term of this patent subsequent to Dec. 15, 1998 has been disclaimed.

[21] Appl. No.: 399,532

[22] Filed: Jul. 19, 1982

Related U.S. Application Data

[60] Division of Ser. No. 236,344, Feb. 20, 1981, Pat. No. 4,352,854, which is a continuation-in-part of Ser. No. 134,829, Mar. 28, 1980, abandoned.

[51] Int. Cl.$^3$ ............................ C08J 9/10; C08L 53/02
[52] U.S. Cl. ........................................ 521/89; 521/81; 521/95; 521/139; 521/140; 521/915; 525/92; 525/98; 525/99; 525/901
[58] Field of Search ................. 521/139, 140, 88, 86, 521/89

[56] References Cited

U.S. PATENT DOCUMENTS 4,206,850 3/1981 Thorsud .............................. 521/139
4,306,034 12/1981 Thorsud .............................. 521/139
4,352,854 10/1982 Siedenstrang et al. .......... 428/318.8

*Primary Examiner*—Morton Foelak

[57] ABSTRACT

A molded object having a sponge-like interior surrounded by a skin, molding composition from which it is produced, and the method for producing the article. Copolymers of vinyl-substituted aromatic compounds containing from 8–18 carbon atoms copolymerized with conjugated diene having from 4–12 carbon atoms and polymer chosen from among solid resinous polymers of vinyl-substituted aromatic compounds present in amounts ranging from about 10 to about 75 parts by weight per 100 parts by weight of the copolymer and solid resinous copolymers of ethylene present in an amount of about 5 to about 50 parts by weight per 100 parts by weight of the copolymer are blended with a sufficient amount of polarizing agent to achieve rapid heating through response to microwave treatment, blowing agent in an amount sufficient to provide a sponge-like, rubbery porosity to an article molded therefrom, and, optionally, cellular control agent. Composition is melted at a temperature that activates the blowing agent, molded, and removed from the mold as an article having a sponge-like interior surrounded by polymeric skin.

4 Claims, No Drawings

MOLDING COMPOUNDS, SPONGE ARTICLES PRODUCED THEREFROM AND PROCESS OF PRODUCTION

This application is a divisional application of my co-pending application Ser. No. 236,344, filed Feb. 20, 1981 now U.S. Pat. No. 4,352,854, which is continuation-in-part of a copending application having Ser. No. 134,829, filed Mar. 28, 1980.

BACKGROUND OF THE INVENTION

This invention relates to rubbery compositions and articles molded therefrom. In one of its aspects, this invention relates to a process for molding articles. In another of its aspects, this invention relates to molding compositions. In still another of its aspects, this invention relates to the use of microwave energy in molding thermoplastic compositions.

In the molding of compositions based on the combination of a thermoplastic block copolymer elastomer and a normally solid resinous polymer combined with the polarizing agent in sufficient amount to achieve rapid heating through response to microwave treatment, it is known that an article having a skin and a porous interior can be produced by the addition of blowing agent to the molding composition with subsequent melting and molding at temperatures sufficient to activate the blowing agent. It has now been discovered that by controlling the amount of blowing agent present in the molding compositions the porosity and skin thickness of the molded article can be controlled so that articles can be produced having relatively thin skin surrounding a sponge-like interior which are suitable for use in services where a soft feel and easy bending are desirable such as metatarsal supports.

In these products, structural integrity of the polymeric walls surrounding the interstitial voids is of great importance so that the shape of the molded article can be maintained. To maintain the load bearing strength of the cell walls, it has been found necessary when relatively large pores are produced in the blown, molded objects to introduce stabilizing compounds into the molding compositions to maintain the structural stability of the molded objects.

It is therefore an object of this invention to provide a molded polymeric material in which a central portion of sponge-like appearance is surrounded by a thin skin of highly dense material. It is another object of this invention to provide a method for preparing a molded article in which a thin skin of highly dense material surrounds a sponge-like interior. It is still another object of this invention to provide a molding composition from which a molded object having a thin skin surrounding a sponge-like interior can be prepared.

Other aspects, objects and the various advantages of this invention will become apparent upon reading this specification and the appended claims.

STATEMENT OF THE INVENTION

According to this invention a molding composition is provided from which a molded article comprising a thin, dense skin surrounding a sponge-like, rubbery interior can be produced. The composition comprises (1) vinyl-substituted aromatic compounds containing from 8–18 carbon atoms copolymerized with conjugated diene having from 4–12 carbon atoms, (2) resinous, solid polymer of vinyl-substituted aromatic compound in the range of about 10 to about 60 parts resinous polymer per 100 parts copolymer from (1), (3) polarizing agent, and (4) blowing agent in an amount sufficient to provide a sponge-like, rubbery porosity to an article molded therefrom.

In an embodiment of the invention a method is provided for producing a molded object having an interior of rubbery, sponge-like porosity surrounded by a thin dense skin. In this method a molding composition as described above is introduced into a mold, melted with microwave energy at a temperature sufficient to activate the blowing agent, subjected to molding conditions, and removed from mold as a molded article.

In another embodiment of the invention a method is provided for molding articles in which (1) vinyl-substituted aromatic compounds containing from 8–18 carbon atoms copolymerized with conjugated diene having 4–12 carbon atoms, (2) resinous, solid polymer of vinyl-substituted aromatic compound in the range of about 10 to about 60 parts resinous polymer per 100 parts copolymer, (3) polarizing agent, and (4) blowing agent in an amount sufficient to provide a sponge-like porosity to the interior of the molded object are blended into a molding composition, (b) the molding composition is introduced into a mold, (c) melted with microwave energy at a temperature sufficient to activate the blowing agent, (d) subjected to molding conditions, and (e) removed from the mold as a molded article. The molded article produced by this method illustrates yet another embodiment of the invention.

Thermoplastic rubber sponge products are formed in the process of this invention by employing compositions containing as the rubber(s) a normally solid thermoplastic elastomer. The compositions are heat softened for subsequent molding in a microwave energy field. Low molding pressures, that is molding pressures below about 200 psi (1.4 MPa) are characteristically utilized in forming the products that are made in the process of the instant invention.

For the purpose of this invention the microwave frequencies which can be employed range from about 10 $MH_z$ to about 100 $MH_z$. Of particular interest are the frequencies of 12 $MH_z$ and 40 $MH_z$ since large power tubes, e.g., klystrons, magnetrons, are available for converting direct current into microwave energy.

Suitable thermoplastic elastomers in this invention are normally solid, block copolymers which exhibit high tensile strength and elongation in their unvulcanized (green) state. The block copolymers can be formed by copolymerizing a vinyl-substituted aromatic compound containing from 8 to 18 carbon atoms with a conjugated diene having from 4 to 12 carbon atoms as described in U.S. Pat. No. 3,281,383 which issued to R. P. Zelinski and H. L. Hsieh.

Paritcularly suitable block copolymer usefully employed in this invention are the linear block or radial teleblock copolymers of butadiene and styrene. Such copolymers are more completely described in U.S. Pat. Nos. 3,823,109; 3,826,776; and 3,959,545, incorporated here by reference.

These butadiene/styrene block copolymers generally contain from about 10 to about 50 weight percent polymerized styrene and about 90 to about 50 weight percent polymerized butadiene, preferably from about 20 to about 50 weight percent polymerized styrene and from about 80 to about 50 weight percent polymerized butadiene. The block copolymers generally possess a weight average molecular weight in the range from about 75,000 to about 500,000 with a range from about 100,000 to about 350,000 being more preferable. A mixture of such polymers can be employed to modify melt flow, stiffness, and like characteristics, if desired.

Other components of the sponge-forming compositions of this invention include normally solid resinous polymers of vinyl-substituted aromatic compounds, e.g., styrene, alpha-methyl styrene, alone or copolymerized with a monomer such as acrylonitrile or with minor amounts of a conjugated diene such as 1,3-butadiene. These polymers, which can be selected to increase the melt flow of the compositions, generally have a density ranging from about 1.04 to about 1.10 g/cc and a tensile strength ranging from about 5,000 to about 12,000 psi (34.5–82.7 MPa), ASTM D 638, and a Shore A hardness ranging from about 35 to about 95 (ASTM D 2240) at 23° C. Such polymers are generally used in amounts ranging from about 10 to about 75 parts by weight per 100 parts by weight block copolymer. Other normally solid resinous polymers which can be employed also include copolymers of ethylene with monomers such as ethyl acrylate, vinyl acetate, and the like. Polymers of this type can improve the response of the final composition to the effects of microwave energy as well as improving the melt flow of the compositions. Suitable copolymers of this class are selected so that their melting points range from about 200° to about 250° F. (93°–121° C.). These polymers are generally employed in amounts ranging from about 5 to about 50 parts by weight per 100 parts by weight block copolymer.

Polarizing agents are included in the compositions employed in the process of this invention to insure that they will melt in a microwave field. The agents are normally liquid or normally solid polar compounds and are generally selected from among simple and polymeric alkylene glycols and their mono and dialkyl ethers, ethanolamines and isopropanolamines and their hydrocarbyl-substituted derivatives and mixtures thereof. Specific examples of these compounds include ethylene glycol, 1,2-propylene glycol, 1,3-butylene glycol, 1,4-butylene glycol, 1,6-hexylene glycol, diethylene glycol, triethylene glycol, dipropylene glycol, thiodiethylene glycol, etc., polyethylene glycols having average molecular weights ranging from about 200 to about 6,000; polypropylene glycols having average molecular weights averaging from about 400 to about 2,000; mixed poly(ethylene)-poly(propylene) glycols having average molecular weights ranging up to about 6,000 and containing from about 30 to about 90 weight percent ethylene oxide; the monomethyl, monoethyl and monobutyl ethers of ethylene glycol, propylene glycol and diethylene glycol; the monomethyl and monoethyl ethers of triethylene glycol; the dimethyl and diethyl ethers of diethylene glycol, dipropylene glycol and trimethylene glycol; the alkanolamines based on ethanol and isopropanol such as mono-, di- and triethanolamine, mono-, di- and triisopropanolamine, methylethanolamine, dibutylethanolamine, phenyldiethanolamine, di(2-ethylhexyl)ethanolamine, dimethylisopropanolamine, dibutylisopropanolamine, and the like; and mixtures thereof. Other polar compounds such as liquid acrylonitrile butadiene polymers, acrylonitrilebutadiene blends with homopolymers of polyvinylchloride and styrene acrylonitrile copolymers are effective. Other agents include glyceryl diacetate and di(2-hydroxyethyl)-5,5-dimethylhydantoin. Particularly suitable polarizing agents include triethanolamine and polyethylene glycol, e.g., Carbowax$^R$ 540, totaling from about 3–8 parts by weight per 100 parts by weight thermoplastic elastomer.

Blowing agents, preferably chemical blowing agents are utilized in the compositions at a level sufficient to produce an article which can be irregular in shape, which can exhibit a dense skin and a microporous to sponge-like interior and which can taper off to zero thickness as in the case of metatarsal supports. The level of blowing agent or mixture of agents to employ can range from about 3 to 10 parts by weight per 100 parts by weight thermoplastic elastomer depending upon the desired specific gravity of the finished articles with the spongeness of the article increasing with the amount of blowing agent incorporated (other conditions being the same). Preferably the amount of blowing agent ranges from about 6 to about 10 parts by weight per 100 parts by weight thermoplastic elastomer to produce a sponge-like interior. Particularly suitable compounds are azobisformamide (ABFA) and 4,4'-oxybis (benzenesulfonyl hydrazide) (OBSH) and it is presently preferred to use a mixture of these compounds wherein the weight ratio of ABFA/OBSH can range from about 1:2 to about 4:1.

Other components used in preparing the compositions used in the process of this invention include odorants, colorants, fillers, plasticizing agents, processing aids, antioxidants and UV stabilizers. Suitable fillers include metal silicates, metal oxides, metal carbonates, and the like such as calcium metasilicate, silica, alumina, titania, calcium carbonate, clays, etc. Examples of plasticizing agents include naphthenic petroleum oils, e.g., ASTM type 104A, esters of adipic acid, phthalic acid, etc. Processing aids include the metal stearates, e.g., calcium stearate, zinc stearate, silicones, natural and synthetic waxes, and the like. Antioxidants and UV stabilizers can be added as desired from suitable commercially available materials. Exemplary of these include thiodipropionic esters, e.g., dilaurylthiodipropionate, hindered phenolic antioxidants, e.g., 2,6-di-t-butyl-4-methyl-phenol, octadecyl[3-(3,5-di-t-butyl-4-hydroxyphenyl)]propionate, thiodiethylene bis(3,5-di-t-butyl-4-hydroxy)hydrocinnamate, etc., and UV stabilizers such as 2(2'-hydroxy-5'-methylphenyl)benzotriazole, 2-hydroxy-4-n-octoxybenzophenone, [2,2'-thiobis(4-t-octyl-phenolato)]-n-butylamine-nickel(II), etc. Generally, the amounts of the various components in parts by weight per 100 parts by weight thermoplastic elastomer (php) will be as follows: filler, 10 to 150 php; antioxidant, 0.1 to 1 php, and UV stabilizer, 0.1 to 3 php.

The quantity of plasticizing agents useful in the instant invention ranges from about 20 to about 150 parts by weight per 100 parts by weight of thermoplastic elastomer. A portion or all of said agent can be included in those thermoplastic elastomers which are produced commercially in the form of oil-extended polymers e.g., can contain 50 parts by weight naphthenic oil (plasticizing agent) per 100 parts by weight thermoplastic elatomer.

In addition to the other components described before it is also advantageous to include cellular control agents which supply sufficient strength to the cell walls of highly porous molded articles to make the articles structurally sufficient for practical use. These include nonionic surfactants comprising silicone compounds. For example, a silicone-glycol copolymer can be prepared from a long chain alkyl silicic ester such as the triethyl ester of octadecylsiliconic acid (1 mole) by reaction with about 3 moles of polyethylene glycol containing from about 2 to about 12 repeating units of the —$OCH_2CH_2$— group. The compounds are described in U.S. Pat. Nos. 2,465,307 and 2,476,308. Another suitable class of compounds comprise copolymers of dimethylpolysiloxanes and polyoxyalkylene ethers as for example the compound $C_2H_5Si[O(Si(CH_3)_2O)_a(CH_2CH_2O)_b(C_3H_6O)_c C_4H_9]_3$ where the organic portion is a mixed copolymer containing equal weights of ethylene and propylene oxides and terminates with a butoxy group, the silicone base and each of the three organic branch chains are repeated sufficiently to obtain molecular weights of about 1500. Compounds of this type are described in the 2nd Edition of the Encyclopedia of Chemical Technology 19, 554 (1969).

The amount of cellular control agent if employed, generally ranges from about 0.5 to 2 parts by weight per 100 parts by weight thermoplastic elastomer.

The molded articles are relatively soft materials which have a relatively dense skin and a microporous interior in the thicker portions. Thin portions, e.g., those about 10 mils or less in thickness are generally dense. The average Shore A hardness of the molded articles ranges from about 20 to about 35 (ASTM D 2240-75).

The compositions are normally mixed together by employing compounding means such as roll mills, Banbury mixers, extruders, high intensity mixers, e.g., Henschel mixer, and the like. All of the components can be mixed together at once or a concentrate blend of the sensitizing components alone or with compatible ingredients can first be blended to make a homogeneous mixture and subsequently incorporated into the thermoplastic elastomer that makes up the majority of the molding composition. Maximum temperatures employed must be below the decomposition temperature of any blowing agent present. Usually the compounded formulation is converted into a slab of appropriate dimensions for the mold to be used or the formulation can be converted into a free flowing particulate form by using conventional grinding or pelletizing processes. Desirably, just enough of the particles of a suitably dimensioned preformed slab is used in the molding process to avoid excess flash. The flash and reject articles can be granulated and used as a portion of a mix also comprising virgin material. The weight of reground material in such a mix is preferably no more than about 20 percent of the total when colored materials are used, in general, like colors are blended together.

The molds employed in shaping the invention compositions are generally constructed from low cost, relatively low strength materials including silicone rubber, polysulfide rubber, (Ryton$^R$) polyphenylene sulfide, polyurethane, plaster, cast aluminum, and the like. The nature of the mold is dependent upon the molding process used. If the invention composition is placed within the mold and the entire assembly is preheated by microwave energy, it is preferred that the mold used be made of a material such as silicone rubber that has a lower dielectric loss factor than the invention composition. It is within the scope of this invention to preheat the composition in a low dielectric loss container such as glass or ceramic and transfer it to a mold constructed from metals and the like for the actual shaping step. Generally, the composition is placed within a silicone rubber mold, the mold top is covered with a silicone rubber sheet or a silicone release paper, e.g., paper or the like covered with a release agent such as a silicone, and assembly is placed between the plates of a high frequency electrical field which form a part of commercially available molding machines. The top plate is lowered to contact the release paper covering the mold and the composition is preheated by application of microwave energy for a desired length of time. After preheating to softening temperature, sufficient pressure is employed to compression mold the composition, e.g., about 10 to about 200 psig (68.9–1380 kPa), for a period of time generally ranging from about 0.1 to about 10 times the preheating time. The pressure is released, the assembly is preferably placed in a separate zone for cooling the mold and contents, after which the molded article is removed. A rotary table or the like containing a plurality of molds can be employed to provide molded parts at commercially attractive rates. Separation of the heating and cooling zones speeds production and reduces consumption of power and water.

A suitable microwave unit for molding is a KN unit, Model J, manufactured by Compo-Industries, Inc., Waltham, Mass. This unit which has a 10 kilowatt output, is the one employed in the specific example, unless otherwise indicated.

EXAMPLE

A series of compositions was prepared by mixing the components in a Banbury mixer for 6 minutes at a temperature of about 138° C. Each composition was dumped from the mixer at about 120° C. and granulated. The portion of the granulated material which passed through a screen having ¼ inch (0.6 cm) openings was retained for molding purposes. The formulations employed are shown in Table I and are given in parts by weight.

TABLE I

Thermoplastic Rubber Sponge Compositions

| Component | Composition A | B | C |
|---|---|---|---|
| Thermoplastic elastomer 1[1] | 150 | 0 | 0 |
| Thermoplastic elastomer 2[2] | 0 | 150 | 150 |
| Poly (alpha-methylstyrene)[3] | 40 | 40 | 60 |
| Crystal polystyrene[4] | 25 | 25 | 0 |
| Naphthenic extender oil[5] | 50 | 50 | 50 |
| Silica[6] | 25 | 25 | 25 |
| Stabilizer 1[7] | 0.70 | 0.70 | 0.70 |
| Stabilizer 2[8] | 0.50 | 0 | 0 |
| Zinc stearate | 0 | 0 | 0.30 |
| Blowing agent 1[9] | 3 | 3 | 6 |
| Blowing agent 2[10] | 3 | 3 | 2 |
| Triethanolamine[11] | 3 | 4 | 4 |
| Polyethylene glycol[12] | 3 | 3 | 4 |
| TiO$_2$ (pigment) | 0 | 1.4 | 0 |
| Yellow pigment[13] | 0.2 | 0 | 0 |
| Blue pigment[14] | 0 | 0.34 | 0 |
| Total parts | 303.40 | 305.44 | 302.00 |
| Calculated specific gravity | 1.06 | 1.06 | 1.00 |

| Samples Molded | A | B1 | B2 | C |
|---|---|---|---|---|
| Machine Used | Commercial | Model J | Model E | Model J |
| Sample made | mat with protuberances | smooth surface mat | metatarsal support | metatarsal support |
| Heating time, seconds | 50 est. | 50 | 50 est. | 30 |
| Sample specific | 0.65 | 0.60 | 0.55 | 0.50 |

TABLE I-continued

Thermoplastic Rubber Sponge Compositions gravity

Notes
[1] Phillips Petroleum Co., Bartlesville, OK; radial teleblock 40/60 styrene/butadiene copolymer, weight average molecular weight of 240,000, extended with 50 parts by weight naphthenic oil per 100 parts by weight copolymer.
[2] Phillips Petroleum Co., radial teleblock 30/70 styrene/butadiene copolymer, weight average molecular weight of 300,000, extended with 50 parts by weight naphthenic oil per 100 parts by weight copolymer.
[3] Amoco Chemical Corp., St. Paul, MN; linear homopolymer with softening point of 240° F. (116° C.), ASTM D 36.
[4] Cosden Oil & Chemical Co., Big Spring, TX; Cosden ® 500 Special.
[5] ASTM type 104A, Flexon ® 766, Exxon Co., Houston, TX.
[6] PPG Industries Inc., Pittsburgh, PA; Hi Sil ® 233, precipitated, hydrated silica, 2.0 specific gravity, ultimate particle size of 0.22 micron (2.2 × $10^{-5}$ mm).
[7] Zinc dibutyldithiocarbamate.
[8] Ciba-Geigy Industrial Chemicals, Ardsley, NY; Tinuvin ® P, 2(2'-hydroxy-5'-methylphenyl) benzoatirazole.
[9] Uniroyal, Inc. Chemicals Div., Naugatuck, CT; Celogen ® AZ, azobisformamide.
[10] Uniroyal, Inc. Celogen ® OT, 4,4'-oxybis(benzenesulfonyl hydrazide).
[11] Polarizing agent.
[12] Polarizing agent, Union Carbide Corp., New York, NY; Carbowax ® 540, average molecular weight of about 540.
[13] Ciba-Geigy Industrial Chemicals; Cd Lith Primrose 206.
[14] Custom Color, Inc. Lodi, OH; Microclean ® 42,715 UC, masterbatch containing 80 parts by weight blue pigment per 100 parts by weight normally solid radial teleblock styrene/butadiene copolymer.

Molded articles were made from the formulations given in the Table using both lab size and commercial size equipment. Formulation C represents an especially suitable one. A metatarsal support was molded from it after a 30 second heating period having a maximum thickness of about ¼ inch (0.6 cm) tapering off to zero at the periphery, which exhibited good interconnecting cellular structure with good skin formation and an average specific gravity of 0.5.

We claim:
1. A molding composition comprising:
   (a) vinyl-substituted aromatic compounds containing from 8-18 carbon atoms copolymerized with conjugated diene having from 4-12 carbon atoms,
   (b) resinous solid polymer of vinyl-substituted aromatic compound in the range of about 10 to about 60 parts resinous polymer per 100 parts said copolymer,
   (c) polarizing agent, and
   (d) blowing agent in an amount in the range of about 6 to about 10 parts by weight per 100 parts by weight of thermoplastic polymer, said amount sufficient to produce upon activation and molding an article of rubbery, sponge-like porosity surrounded by a thin, dense skin.
2. A molding composition of claim 1 wherein the blowing agent is a mixture of azobisformamide (ABFA) and 4,4'-oxabis(benzenesulfonylhydrazide) (OBSH) in a weight ratio range of about 1:2 to about 4:1 of ABFA/OBSH.
3. A molding composition of claim 1 wherein the composition further comprises at least one cellular control agent.
4. A molding composition of claim 3 wherein the composition further comprises a silicone-glycol copolymer as cellular control agent.

* * * * *